Aug. 9, 1960
L. T. EBY ET AL
2,948,700
HEAT REACTING BUTYL RUBBER, HALOGENATED
BUTYL RUBBER AND ZINC OXIDE, AND
COMPOSITION OBTAINED THEREBY
Filed April 4, 1957
RUN-1
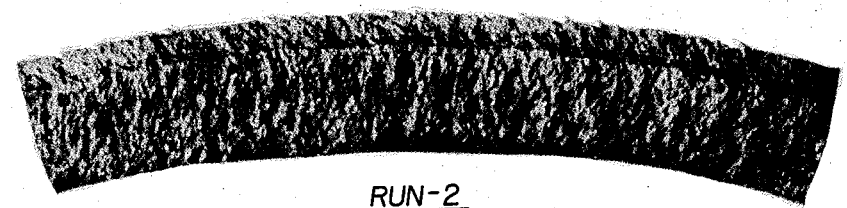
RUN-2
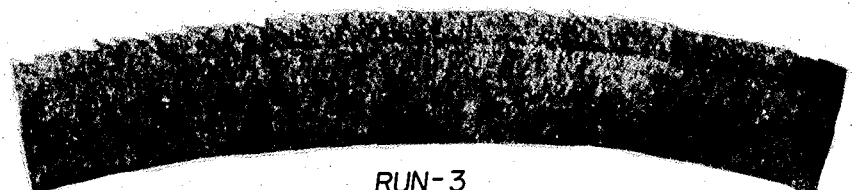
RUN-3
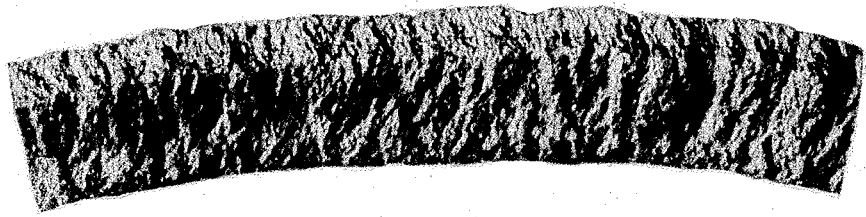
RUN-4
Lawrence T. Eby
Robert M. Thomas
INVENTORS
BY
W. H. Smyers
ATTORNEY _United States Patent Office_

2,948,700
Patented Aug. 9, 1960

2,948,700

HEAT REACTING BUTYL RUBBER, HALOGENATED BUTYL RUBBER AND ZINC OXIDE, AND COMPOSITION OBTAINED THEREBY

Lawrence T. Eby, Linden, and Robert M. Thomas, Westfield, N.J., assignors to Esso Research and Engineering Company, a corporation of Delaware Filed Apr. 4, 1957, Ser. No. 650,647

13 Claims. (Cl. 260—41.5)

This invention relates to improved methods of processing or finishing rubbery homopolymers or copolymers such as high molecular weight rubbery polymerization products of isoolefins or mixtures of 85 to 99.5% of isoolefins and 15 to 0.5% of multiolefins, including such operations as milling, calendering, or especially extruding.

High molecular weight polyisoolefins such as polymers of $C_4$ to $C_7$ isoolefins including 2-methyl-1-butene, 3-methyl-1-butene and especially isobutylene or the like, or copolymers of the type of butyl rubber containing about 85 to 99.5 weight percent of such $C_4$ to $C_7$ isoolefins and about 15 to 0.5 weight percent of $C_4$ to $C_{14}$ multiolefins (preferably conjugated diolefins) such as butadiene, dimethyl butadiene, piperylene, cyclopentadiene, vinyl fulvenes, and especially isoprene, may be produced at temperatures of between about —30° to —160° C. using a Friedel-Crafts catalyst and a $C_1$ to $C_3$ alkyl halide polymerization diluent such as methyl chloride. Copolymers so produced generally have Wijs iodine numbers between about 0.5 and 50.5. When such copolymers or homopolymers have viscosity average molecular weights of between about 300,000 and 15 million or especially between about 500,000 and 10 million, their rate of extrusion, milling or calendering is relatively slow. The extrudates formed also generally do not have a smooth appearance and tend to become swelled during extrusion. It has been proposed to correct this situation by the use of large amounts of certain types of fillers such as about 100 or 150 parts by weight of various clays or carbon blacks per 100 parts by weight of polymer or copolymer. However, this procedure has not been entirely satisfactory for either such homopolymers or copolymers as the foregoing because even then entirely smooth extrusion cannot be made with the higher molecular weight polymers and the physical properties of the extruded rubber with high loading are not a match for those with less filler present.

In accordance with the present invention, the above-mentioned disadvantages are overcome and such homopolymers and copolymers as those hereinbefore mentioned are rendered easily extruded, milled, or calendered by heating the same prior to finishing for several seconds to about 30 minutes or more, preferably for about 0.5 to 20 minutes at about 200° to 400° F. preferably at about 250° to 350° F., with a minor proportion, preferably about 10 to 40 weight percent of a composition comprising a halogenated rubbery isoolefin-multiolefin copolymer having a viscosity average molecular weight of between about 50,000 and 1,000,000 and about 2 to 30, preferably about 3 to 20 parts by weight, per 100 parts by weight of total polymers, of zinc oxide. The heat treatment may also optionally be performed in the presence of accelerators such as thiocarbamic acid derivatives including alkyl thiuram sulfides, metallo dialkyl thiocarbamates; mercaptobenzothiazole or derivatives of mercaptobenzothiazole such as benzothiazyl disulfide, and/or phenol-dialcohol resins of the polymethylol phenol type in addition to the zinc and oxygen-containing compound. Such auxiliary materials may be used in amounts of about 0.05 or 2.0 parts by weight per 100 parts by weight of total polymers up to an amount approximately equivalent in weight to the zinc and oxygen-containing compound, the only prerequisite being that the amounts of such materials are insufficient to cause the unhalogenated copolymer to undergo substantial vulcanization during heating.

In the case of rubbery isoolefin-multiolefin copolymers, the heat treated mixture formed may then be extruded, calendered, or milled with facility and cooled to below about 250° F. and preferably below about 150° F. with the addition of such conventional compounding ingredients as sulfur, carbon blacks or mineral fillers, sulfur-containing accelerators and/or quinone dioxime or derivatives of quinone dioxime, and/or primary or polyfunctional amines, and/or additional zinc oxide if needed, and/or polymethylol phenol resins, plasticizers, stearic acid, etc. and subsequently vulcanized as more fully described hereinafter. It has also been found that such compounded stocks formed may be extruded or calendered prior to vulcanization more smoothly and rapidly than when no halogenated rubbery isoolefin-multiolefin copolymer has been added or when the halogenated rubber is replaced by an unhalogenated rubbery isoolefin-multiolefin copolymer of comparable molecular weight. It has also been found that high molecular weight polyisobutylene and other polymers of $C_4$ to $C_7$ isoolefins may be processed, as by extrusion, calendering, milling or the like, with facility by the process of the present invention. However, since the addition of compounding ingredients such as fillers, resins, and plasticizers is optional in the case of polyisoolefins, the extrusion or calendering may be performed on the stock directly from the heat treatment. Both such copolymers and polyisoolefins as above-mentioned, because of the heat treatment with halogenated isoolefin-multiolefin copolymers and zinc and oxygen-containing compounds, in accordance with the present invention, exhibit a combination of reduced "nerve" and reduced cold flow. Also, vulcanizates of isoolefin-multiolefin copolymers which have been processed in accordance with the present invention, when cured for about 10 to 100 minutes at temperatures between about 275° and 450° F. exhibit improved physical properties such as a decreased permanent set.

The halogenated isoolefin-multiolefin copolymer to be heat interacted in the presence of zinc and oxygen containing compounds with the polymeric materials in accordance with the present invention may be prepared by the mild chlorination or bromination of the unhalogenated hydrocarbon copolymer commonly known as Butyl rubber. The preparation of Butyl rubber is described in U.S. Patent 2,356,128 as well as in the book "Synthetic Rubber" by G. S. Whitby. The halogenation is preferably carried out so as to make the resulting halogenated Butyl rubber contain at least 0.5 weight percent and preferably at least about 1.0 weight percent combined chlorine or bromine but not more than about "X" weight percent chlorine or 3.0 "X" weight percent bromine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, the polymer should have a halogen content of at least about 0.5 weight percent but not more than about 1 atom of chlorine or 3 atoms of bromine per molecule of multiolefin present in the polymer, i.e. not more than about 1 atom of chlorine or 3 atoms of bromine per double bond in the copolymer.

Suitable halogenating agents which may be employed are gaseous chlorine, liquid bromine, alkali metal chlorites, sulfuryl bromide, sulfuryl chloride, pyridinium chloride perchloride, N-bromo succinimide, N,N'-dichloro dimethyl hydantoin, alpha-chloroaceto acetanilide, iodine monochloride, tribromo phenol bromide, N-chloro-acetamide, beta-bromomethyl phthalimide, etc. The halogenation is advantageously conducted at temperatures of between above 0° C. to about 100° C., preferably at about 20° to 80° C. for about one minute to several hours. However, the temperatures and times are regulated to halogenate the rubbery copolymer to the extent above-mentioned.

The halogenation may be accomplished in various ways. One process comprises preparing a solution of the copolymer as above in a suitable inert liquid organic solvent and adding thereto chlorine or bromine or other halogenating agent optionally in solution, such as dissolved in an alkyl chloride, carbon tetrachloride, etc. In this instance the low molecular weight rubbery copolymer is halogenated separately and subsequently added to the high molecular weight unhalogenated rubbery copolymer. The solvent is then stripped out and the zinc and oxygen-containing compound added with a subsequent heat treatment prior to vulcanization of the unhalogenated high molecular weight copolymer in accordance with the invention.

Another method resides in blending with the low molecular weight copolymer a solid halogenating agent such as N-bromo or chloro-succinimide, N,N'-dichloro or dibromo dimethylhydantoin, or other solid halogenating agent. In such a case, the resulting mixture is preferably mill-mixed and heated to a temperature sufficient to halogenate the solid copolymer. It is also within the purview of the present invention to blend the low molecular weight copolymer with a solid brominating or chlorinating agent such as those above-mentioned and to heat the blend formed to a temperature sufficient to brominate or chlorinate the solid low molecular weight copolymer in situ. In all of the foregoing instances, the use of elevated or depressed pressures are optional since atmospheric pressure is satisfactory. However, the pressure may vary depending upon the foregoing temperatures, reaction times and particularly halogenating agents from about 0.5 to 500 p.s.i.a.

In order to more fully illustrate the present invention, the following experimental data are given:

*Example I*

Samples of a high molecular weight butyl rubber copolymer having a viscosity average molecular weight of 920,000 and a mole percent unsaturation of 1.2 (hereinafter referred to as H.M. butyl rubber) were compounded with 5.0 parts by weight of zinc oxide (per 100 parts by weight of total rubber) with and without an added lower molecular weight chlorinated butyl rubber (hereinafter referred to as chlorinated butyl rubber "A") or an added unmodified low molecular weight butyl rubber (hereinafter referred to as L.M. butyl rubber). Chlorinated butyl rubber "A" had a Mooney viscosity at 212° F. for 8 minutes of 50, a mole percent unsaturation of 1.6, and a chlorine content of 1.30 weight percent based on the rubber. The unmodified L.M. butyl rubber had a Mooney viscosity at 212° F. for 8 minutes of 50 and a mole percent unsaturation of 1.6. All samples were hot milled for 10 minutes at 310° F. and then compounded with 50 parts by weight, per 100 parts by weight of total rubber, of MPC carbon black and extruded through a Garvey die at 220° F. and 80 r.p.m.

The proportions of ingredients and appearance of the extrudates were as follows:

| Run | Parts by weight ||||| |
|---|---|---|---|---|---|
| | 1 | 2 | 3 | 4 | 4-a [1] |
| H.M. butyl rubber | 100 | 90 | 80 | 80 | 80 |
| Chlorinated butyl rubber "A" | | 10 | 20 | | |
| L.M. butyl rubber | | | | 20 | 20 |
| Zinc oxide | 5 | 5 | 5 | 5 | 5 |
| MPC carbon black | 50 | 50 | 50 | 50 | 50 |
| Extrusion appearance | very rough | smooth | very smooth | very rough | very rough |

[1] Run 4-a had no heat treatment.

Referring now to the accompanying drawing, the four photographs which are designated runs 1, 2, 3, and 4 show sections of the first four above extrusions. It can be seen that the extrudates from run 2 and especially from run 3, in accordance with the present invention, are considerably smoother in appearance than the extrudates having no added chlorinated butyl rubber (run 1) or having added unmodified low molecular weight butyl rubber (runs 4 and 4-a).

One hundred parts by weight each of the above rubber stocks of runs 1, 2, 3, and 4 were each compounded on a rubber mill at room temperature with 1.5 parts by weight of sulfur and 1.0 part by weight of tellurium diethyl dithiocarbamate and the resulting blends vulcanized by heating for 40 minutes at 307° F. The following physical inspections of the cured vulcanizates were noted of which the "appearance" is a visual rating of the cross section of cylindrical slugs cut in half after the standard Goodrich Flexometer test at 0.25 inch stroke, a frequency of 32 cycles per second, operating for 30 minutes at 100° C. (212° F.) with a 15 pound weight (i.e. equivalent to 89 p.s.i.). The appearance rating was in accordance with the following table:

Appearance: Rating
　No porosity _____ 1
　Slight porosity _____ 2
　Very porous _____ 3
　Broken in center (not porous) _____ 4
　Large hole in center and porous _____ 5

The data was as follows:

| Rubber Stock No. | 1 | 2 | 3 | 4 |
|---|---|---|---|---|
| Modulus at 300% Elong. (p.s.i.) | 920 | 930 | 1200 | 875 |
| Tensile strength (p.s.i.) | 3090 | 3290 | 3080 | 2840 |
| Elongation (percent) | 740 | 750 | 630 | 670 |
| Shore "A" hardness | 57 | 54 | 58 | 58 |
| Permanent set (percent) | 22.7 | 17.9 | 18.2 | 20.5 |
| Max. temp. rise (° C.) | 30 | 29 | 20 | 30 |
| Appearance | 5 | 2 | 2 | 5 |

The above data show that the vulcanized rubber stocks 2 and 3, which had been thermally treated with chlorinated butyl rubber and zinc oxide, in accordance with the present invention, prior to vulcanization, cured into vulcanizates of improved (i.e. lower) permanent set and of much better appearance.

*Example II*

The same general procedure as in Example I was repeated heat treating various admixtures of the H.M. butyl rubber with zinc oxide and with either chlorinated butyl rubber "A" or a commercial brominated butyl rubber having a viscosity average molecular weight of 350,000, a Mooney viscosity at 212° F. for 8 minutes of 46, an iodine number of 4.87 cg./g. and a bromine content of 2.83 weight percent (hereinafter referred to as brominated butyl rubber "B"). The compounding and appearance of extrudates from a Garvey die extruded as in Example I were as follows:

| Rubber Stock No. | Parts by weight | | |
|---|---|---|---|
| | 5 | 6 [1] | 7 [1] |
| Component: | | | |
| H.M. butyl rubber | 90 | 90 | 90. |
| Chlorinated butyl rubber "A" | 10 | 10 | |
| Brominated butyl rubber "B" | | | 10. |
| Zinc oxide | 5 | 5 | 5. |
| MPC carbon black | 50 | 50 | 50. |
| Hydrocarbon plasticizer oil [2] | | 15 | |
| Appearance | Very rough. | Smooth. | Smooth. |

[1] Rubber stocks 6 and 7 were hot milled for 10 minutes at 310° F. before the addition of the carbon black and plasticizer oil except stock No. 5 in which all ingredients were added before hot milling.
[2] The hydrocarbon plasticizer oil employed was derived from a naphthenic base crude and had the following properties:

| Property | Employed | Typical Range |
|---|---|---|
| Specific gravity | 0.90 | 0.80–0.97 |
| Flash point, ° F. (open cup method) | 445 | 300–550 |
| Viscosity (S.S.U. at 100° F.) | 510 | 50–2,000 |
| Viscosity (S.S.U. at 210° F.) | 55 | 15–200 |
| Iodine No. (cg./g.) | 16 | 0–50 |

The above data show that the extrudates of rubber stock numbers 6 and 7 of the present invention are smoother than the control extrudate (rubber stock number 5). More particularly, the data show that the heating procedure for rubber stock 5, in which the heat treatment was after (rather than before) the addition of the carbon black, was unsatisfactory. The data also show that either chlorinated butyl rubber or brominated butyl rubber are effective for heat treatment with high molecular weight butyl rubber in the presence of a zinc and oxygen-containing compound, in accordance with the present invention, to improve its processability (e.g. to improve extrusion).

*Example III*

The same general procedure as in Example I was again repeated on four samples of high molecular weight butyl rubber using 5 parts by weight of zinc oxide prior to heat treating and 50 parts by weight of MPC carbon black after heat treating for 10 minutes at 310° F. Additional compounding data, swell index and appearance of the extrudates were as follows:

| Rubber Stock No. | Parts by weight | | | |
|---|---|---|---|---|
| | 8 | 9 | 10 | 11 |
| Component: | | | | |
| H.M. butyl rubber | 90 | 80 | 70 | 60. |
| Chlorinated butyl rubber "A." | 10 | 20 | 30 | 40. |
| Swell index (cc./inch). | 1.40 | 1.24 | 1.17 | 1.10. |
| Appearance | smooth | very smooth. | very smooth. | smooth. |

The above data show that extrudates of good appearance and low swell index are produced in accordance with the present invention when using 10 to 40 weight percent of chlorinated butyl rubber based on total rubber present.

*Example IV*

The same general procedure as in Example I was again repeated substituting a polyisobutylene of 9,300,000 viscosity average molecular weight for the high molecular weight butyl rubber. The polyisobutylene was compounded with 5 parts by weight of zinc oxide and the various amounts of chlorinated butyl rubber "A" indicated hereinafter and compared to a control containing no chlorinated butyl rubber "A." After heat treating for 10 minutes at 310° F. and compounding with 50 parts by weight of MPC carbon black, the following Garvey extrusion data were obtained:

| Rubber Stock No. | Control | 12 | 13 | 14 | 15 |
|---|---|---|---|---|---|
| Polyisobutylene. | 100 | 80 | 70 | 60 | 80. |
| Chlorinated butyl rubber "A." | | 20 | 30 | 40 | 20. |
| Hydrocarbon Plasticizer Oil. [1] | | | | | 15. |
| Extrusion rate (inches/minute). | 68 | 68 | 69 | 97 | 85. |
| Swell index (cc./inch). | 1.86 | 1.29 | 1.18 | 1.33 | 1.31. |
| Appearance of extrudate. | very rough. | smooth. | very smooth. | very smooth. | smooth. |

[1] The hydrocarbon plasticizer oil employed was derived from a naphthenic base crude and had the same properties as in Example II.

The above data show that the extrusion of polyisobutylene is improved by heat treating for 10 minutes at 310° F. in the presence of zinc oxide and chlorinated butyl rubber. There is noted an increase in smoothness and extrusion rate with increased chlorinated butyl rubber content. The addition of the hydrocarbon plasticizer oil increased the rate of extrusion without sacrifice in surface smoothness. It will also be noted that the swell index of all rubber stocks processed in accordance with the present invention (i.e. stocks 12 to 15) exhibited a much lower swell than the control.

Resort may be had to various modifications and variations of the disclosed embodiments of the present invention without departing from the spirit of the invention or the scope of the appended claims.

What is claimed is:

1. In a method for processing a polymer selected from the group consisting of homopolymers of $C_4$ to $C_7$ isoolefins, isoolefin-multiolefin butyl rubber copolymers, and mixtures thereof, said polymers having viscosity average molecular weights of between about 300,000 and 15,000,000, the improvement which comprises heating said polymer, prior to such processing, at a temperature level of between about 200° and 400° F. with a minor proportion of an admixture of a halogenated isoolefin-multiolefin butyl rubber copolymer, the halogen in said halogenated copolymer having an atomic number of at least about 17, and zinc oxide.

2. A method according to claim 1 in which the polymer is compounded after heating with a minor proportion of a carbon black.

3. A method according to claim 1 in which the unhalogenated polymer is a butyl rubber copolymer of about 85 to 99.5 weight percent of isobutylene and a minor proportion of a $C_4$ to $C_{14}$ multiolefin, said unhalogenated polymer having a viscosity average molecular weight of about 500,000 to 10,000,000.

4. A method according to claim 1 in which the unhalogenated polymer is polyisobutylene having a viscosity average molecular weight of between about 500,000 and 10,000,000.

5. A method according to claim 3 in which the unhalogenated polymer, after heating, is compounded with a minor proportion of sulfur and vulcanized for about 10 to 100 minutes at a temperature level of between about 275° and 450° F.

6. An improved isoolefin-multiolefin butyl rubber copolymer-containing vulcanizate having a permanent set of below about 21%, said vulcanizate having been produced by the method of claim 5.

7. In a method for processing a polymer selected from the group consisting of homopolymers of $C_4$ to $C_7$ isoolefins, isoolefin-multiolefin butyl rubber copolymers and mixtures thereof, said polymers having viscosity average molecular weights of between about 300,000 and 15,000,000, the improvement which comprises heating said polymer, prior to such processing, at a temperature level of between about 200° and 400° F. for between about 0.5 to 30 minutes with about 2 to 40 weight percent based on said polymer of an admixture of the reaction product of an unmodified isoolefin-multiolefin butyl rubber copolymer having a viscosity average molecular weight of about 50,000 and 1,000,000 with a halogenating agent having an atomic number of at least about 17, and zinc oxide.

8. A method according to claim 7 in which the zinc oxide is present in an amount of between about 10 and 30 weight percent based on the polymer having a viscosity average molecular weight of between about 300,000 and 15,000,000.

9. A method according to claim 7 followed by compounding the resulting heated polymeric mixture with a minor proportion of carbon black.

10. A method according to claim 7 in which the polymer having a viscosity average molecular weight of about 300,000 to 15,000,000 is an isoolefin-multiolefin butyl rubber copolymer, said copolymer, after heating, having been compounded with a minor proportion of sulfur and vulcanized for about 10 to 100 minutes at a temperature level of between about 275° and 450° F.

11. A composition capable of being extruded and calendered easily, smoothly and with an extrusion swell index below about 1.5 cc./inch, comprising a heat-reacted mixture of a major proportion of an unhalogenated polymer containing at least 85% of $C_4$ to $C_7$ isoolefins, and selected from the group consisting of homopolymers of $C_4$ to $C_7$ isoolefins, isoolefin-multiolefin butyl rubber copolymers, and mixtures thereof, said polymer having a viscosity average mol. wt. of about 300,000 to 15,000,000, a minor proportion of a halogenated isoolefin-multiolefin butyl rubber copolymer containing at least 85% of isoolefin, in which the halogen has an atomic number of at least 17, and zinc oxide.

12. Composition according to claim 11 in which the unhalogenated polymer is a polyisobutylene having a viscosity average mol. wt. of at least 500,000.

13. Composition according to claim 11 in which the unhalogenated polymer is an isobutylene-isoprene butyl rubber copolymer containing at least 85% of isobutylene, and having a viscosity average mol. wt. of at least 500,000.

No references cited.